United States Patent
Lin et al.

(10) Patent No.: US 7,542,811 B2
(45) Date of Patent: Jun. 2, 2009

(54) CONTROL APPARATUS WITH A BALANCE FEEDBACK FUNCTION

(75) Inventors: Ming-Hui Lin, Taipei (TW); Vam Chang, Taipei (TW)

(73) Assignee: Inventec Corporation (TW)

( * ) Notice: Subject to any disclaimer, the term of this patent is extended or adjusted under 35 U.S.C. 154(b) by 242 days.

(21) Appl. No.: 11/808,152

(22) Filed: Jun. 7, 2007

(65) Prior Publication Data

US 2008/0306616 A1    Dec. 11, 2008

(51) Int. Cl.
*G05B 15/00* (2006.01)
*A63F 9/24* (2006.01)
*A63F 13/00* (2006.01)
*G06F 17/00* (2006.01)
*G06F 19/00* (2006.01)
*G06F 3/033* (2006.01)
*G09G 5/08* (2006.01)

(52) U.S. Cl. ............... 700/85; 463/38; 345/158; 345/161; 345/163

(58) Field of Classification Search ............. 700/83–85; 463/1, 36–38; 345/156–158, 161, 163; 273/148
See application file for complete search history.

(56) References Cited

U.S. PATENT DOCUMENTS 4,817,950 A * 4/1989 Goo .................... 463/36
5,414,801 A * 5/1995 Smith et al. ............... 345/419
5,551,518 A * 9/1996 Stratton .................. 172/4.5
5,563,629 A * 10/1996 Caprara .................. 345/160
6,461,238 B1 * 10/2002 Rehkemper et al. ............ 463/6
7,017,686 B2 * 3/2006 Kamen et al. ............. 180/7.1
2007/0139377 A1 * 6/2007 Chiang et al. .............. 345/163
2008/0074385 A1 * 3/2008 Jouanet et al. ............. 345/156
2008/0132339 A1 * 6/2008 Taira ...................... 463/43
2008/0174550 A1 * 7/2008 Laurila et al. .............. 345/158
2008/0188870 A1 * 8/2008 Andre et al. ............... 606/130
2008/0300055 A1 * 12/2008 Lutnick et al. ............. 463/39

* cited by examiner

*Primary Examiner*—Crystal J Barnes-Bullock
(74) *Attorney, Agent, or Firm*—Bacon & Thomas, PLLC

(57) ABSTRACT

A control apparatus with a balance feedback function includes a direction control module for outputting several direction signals of different directions; an operation control module outputting several control signals of different operations; a balance control module for detecting the control apparatus and presetting a tilting angle between horizontal planes to generate a horizontal shift vector signal or detecting a vertical shift in the vertical direction of the control apparatus to generate a corresponding vertical vector signal; a processing module coupled to the balance control module for receiving the direction signal to produce a corresponding direction data, for receiving the operation control signal to produce a corresponding operation control data, for receiving the horizontal shift vector signal to produce a horizontal vector data, and for receiving the vertical vector signal to produce vertical vector data; and a transmission module provided for transmitting any one of the data to an electronic device to achieve the balance feedback control.

10 Claims, 3 Drawing Sheets

CONTROL APPARATUS WITH A BALANCE FEEDBACK FUNCTION

FIELD OF THE INVENTION

The present invention relates to control apparatus, and more particularly to a control apparatus having a balance control module for detecting the control apparatus.

BACKGROUND OF THE INVENTION

Nowadays, the world is stepping into a high-tech era wherein electronic industry is booming. Due to progresses in manufacturing technology and reduction in material costs, electronic products have been widely owned by consumers. Also, along with the improvement in living standard, ordinary entertainment products (for example, computers, MP3 players or game consoles) have been widely accepted by the consumers, and new models are continuously presented to the consumers. Among these entertainment products, the game consoles are particularly welcomed by young people nowadays. In visual design of game software, a large amount of special effects and images, such as 2D images or 3D images, are used to meet game fans' visual needs. In addition, with respect to hardware, the performance of game consoles has been greatly enhanced, and the game console type has also been greatly developed, including arcade game machines placed in public areas, family game consoles (for example, PlayStation 2), and handheld game machines, thus providing the consumers with a diversity of choice. Therefore, to meet the consumers' demands, game machine manufacturers continuously introduce various game software and game consoles to the public to gain more attention from the consumers. Also, as means for operating the game, control apparatus such as joysticks are typically used. However, the conventional joysticks can only be operated by pressing or pushing control keys thereon. This operation manner is monotonous and can be hard in bringing the game players into the environment the games try to build.

SUMMARY OF THE INVENTION

In attempts to address the shortcomings of the conventional joysticks during use, therefore, the inventor has developed a control apparatus with a balance feedback function to address the shortcomings set forth above.

An objective of the present invention is to provide a control apparatus with a balance feedback function. The control apparatus comprises a direction control module, an operation control module and a balance control module. The direction control module comprises a plurality of direction keys configured to output a plurality of direction signals of different directions. The operation control module is configured to output a plurality of different operation control signals. The balance control module is configured to detect a tilting angle between the control apparatus and a preset horizontal plane to generate a corresponding horizontal shift vector signal, or detect a vertical shift in a vertical direction of the control apparatus to generate a corresponding vertical vector signal. The direction control module, the operation control module and the balance control module are each coupled to a processing module configured in the control apparatus. The processing module is configured to receive one of the direction signal, the operation control signal, the horizontal shift vector signal, and the vertical vector signal for respectively producing one of a corresponding direction data, a corresponding operation control data, a corresponding horizontal vector data, and a corresponding vertical vector data, and transmit one of the data through a transmission module configured in the control apparatus to an electrical apparatus that is coupled with the transmission module, thereby achieving more direction control than that of the conventional joysticks.

BRIEF DESCRIPTION OF THE DRAWINGS

The foregoing aspects, as well as many of the attendant advantages and features of this invention will become more apparent by reference to the following detailed description, when taken in conjunction with the accompanying drawings, wherein.

DETAILED DESCRIPTION OF THE PREFERRED EMBODIMENTS

Figure 1:
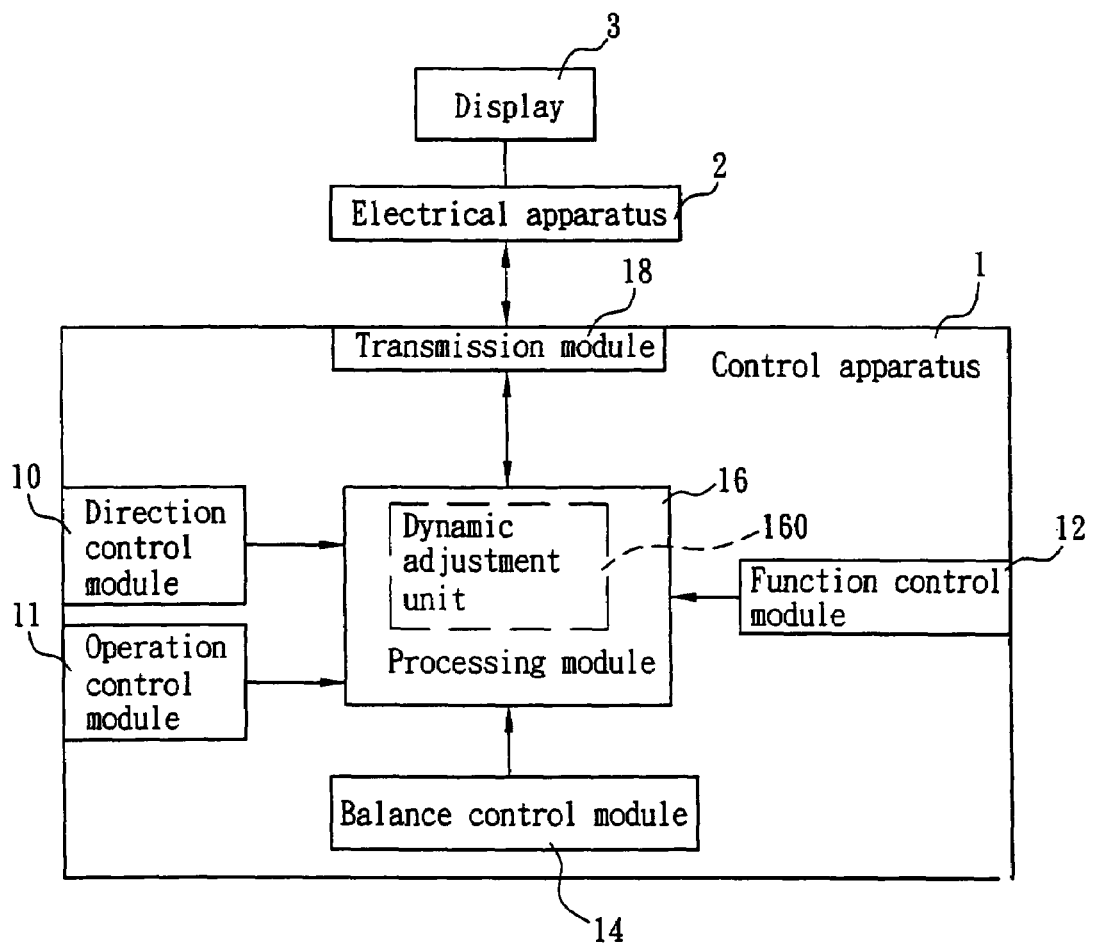
FIG. 1 is a block diagram of a control apparatus in accordance with the present invention.
Figure 2:
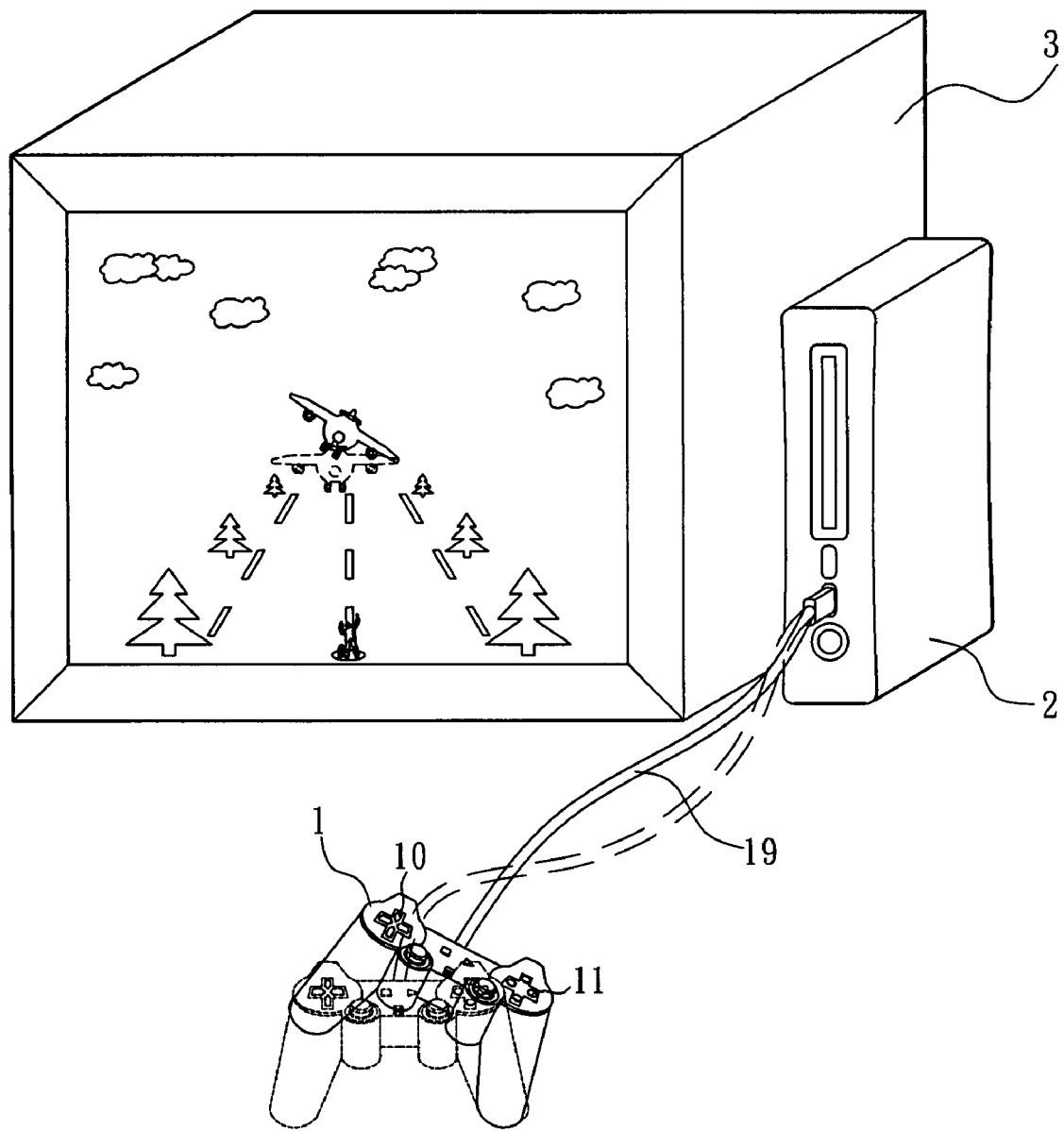
FIG. 2 is a view showing the control apparatus in accordance with present invention being used with an electrical apparatus.

The present invention discloses a control apparatus with a balance feedback function, and the control apparatus 1 may be a joystick or a mouse. Referring to FIGS. 1 and 2, the control apparatus 1 at least includes a direction control module 10, an operation control module 11, and a balance control module 14. The direction control module 10 includes a plurality of direction keys which, when being operated by a user, output a plurality of direction signals of different directions according to the operation of the user. The operation control module 11 comprises a plurality of operation control keys which, when being operated by the user, output a plurality of different operation control signals according to the operation of the user. The balance control module 14 can detect a tilting angle (i.e., tilting forward, backward, left, or right) between the control apparatus 1 and a preset horizontal plane to generate a corresponding horizontal shift vector signal. The balance control module 14 can also detect a vertical shift (i.e., moving up or down) in a vertical direction of the control apparatus 1 to generate a corresponding vertical vector signal.

The balance control module 14 may be an apparatus including a gyroscope, a level instrument or the like, to measure the tilting angle between the control apparatus 1 and the preset horizontal plane. The balance control module 14 sets the position where the control apparatus 1 is enabled as an initial position (origin).

In addition, the control apparatus 1 includes a processing module 16 and a transmission module 18. The processing module 16 is coupled to each of the direction control module 10, a function control module 12, the balance control module 14, and the transmission module 18. The transmission module 18 is coupled to an electrical apparatus 2 located outside of the control apparatus 1.

When the processing module 16 receives the direction signal, the processing module 16 produces a corresponding direction data according to the direction signal. When the processing module 16 receives an operation control signal, the processing module 16 produces a corresponding operation control data according to the operation control signal. When the processing module 16 receives the horizontal shift vector signal, the processing module 16 produces a horizontal vector data according to the horizontal shift vector signal. When the processing module 16 receives the vertical vector signal, the processing module 16 produces a vertical vector data according to the vertical vector signal. After the processing module 16 produces any one of the direction data, operation control data, horizontal vector data, and vertical vector data, the processing module 16 transmits the produced data to the transmission module 18. And the transmission module 18 receives and transmits the direction data, operation control data, horizontal vector data, or vertical vector data to the electrical apparatus 2.

Besides, the electrical apparatus 2 is coupled to a display 3 and can transmit images produced by the electrical apparatus 2 to the display 3. Referring to FIG. 2, the control apparatus 1 not only can use the direction control module 10 or function control module 12 to realize general control inputs to the electrical apparatus 2, but also can be tilted forward, backward, left, or right, or moved up or down, to enable the balance control module 14 to produce corresponding horizontal vector data or vertical vector data to achieve the balance feedback control. Therefore, by means of the operation as described above, an object (for example, cursor or aircraft) on the display 3 can be controlled to do actions such as tilting forward, backward, left, or right in place.

Referring again to FIG. 1, in one embodiment of the present invention, the processing module 16 includes a dynamic adjustment unit 160 therein. The dynamic adjustment unit 160 is configured to process or compute the horizontal shift vector signal or vertical vector signal received by the processing module 16. When the processing module 16 receives a start signal for starting the dynamic adjustment unit 160, the dynamic adjustment unit 160 produces corresponding horizontal vector data or vertical vector data according to at least one of the horizontal vector signal and vertical vector signal currently received by the processing module 16. The dynamic adjustment unit 160 then transmits the horizontal or vertical vector data to the electrical apparatus 2 to achieve real-time balance feedback control.

It should be noted that, the start signal is generated by the electrical apparatus 2 and transmitted to the processing module 16 through the transmission module 18, for starting the dynamic adjustment unit 160. As such, the user is allowed to use the balance control module 14 to carry out the control at an appropriate time, and the control signal is transmitted to the electrical apparatus 2 after being processed by the dynamic adjustment unit 160.

Figure 3:
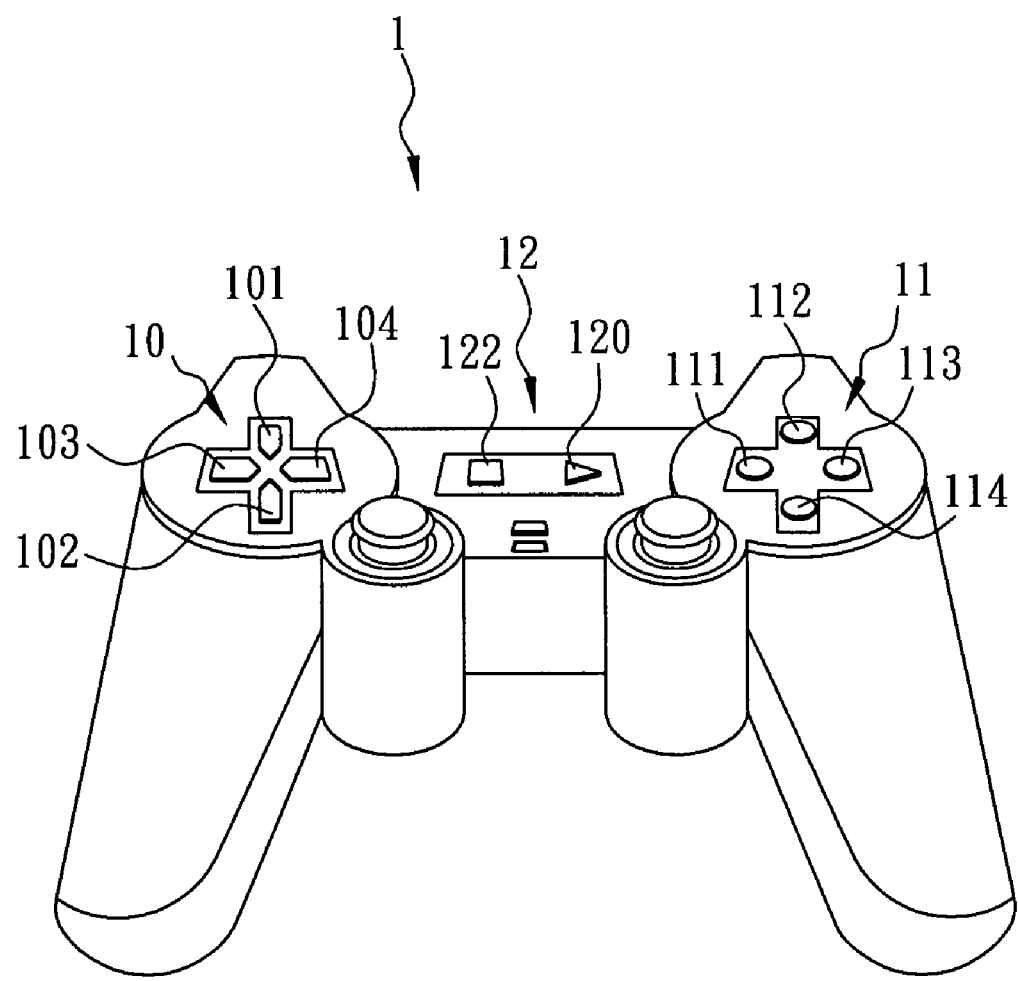
FIG. 3 is a perspective view of the control apparatus in accordance with the present invention.

Referring together to FIGS. 1 and 3, in this embodiment, the direction control module 10 at least includes an up direction key 101, a down direction key 102, a left direction key 103 and a right direction key 104 located at a top surface thereof. When the up direction key 101, down direction key 102, left direction key 103 or right direction key 104 are pressed, corresponding direction signals are produced. The processing module 16 then respectively receives the up direction signal, down direction signal, left direction signal and right direction signal, and correspondingly transforms them into an up direction data, a down direction date, a left direction data and a right direction data. Thereafter, the transmission module 18 transmits these direction data to the electrical apparatus 2, thereby achieving the control of moving forward, backward, and turning left, right.

Referring together to FIGS. 1 and 3, in this embodiment, the operation control module 11 includes a first operation control key 111, a second operation control key 112, a third operation control key 113 and a fourth operation control key 114 located at a surface thereof. When the first operation control key 111, second operation control key 112, third operation control key 113 and fourth operation control key 114 are pressed, corresponding operation control signals are produced. The operation control module 11 then transmits these operation control signals to the processing module 16. The processing module 16 then transforms them into corresponding operation control data. Thereafter, the transmission module 18 transmits these operation control data to the electrical apparatus 2, thereby achieving the control of, for example, cancelling, confirming or exiting.

Referring to FIGS. 1 and 3, in this embodiment, the function control module 12 formed on the surface of control apparatus 1 is electrically coupled to the processing module 16, and outputs a plurality of function signals in response to operation of the user. When the function signals are transmitted to the processing module 16, the processing module 16 generates corresponding function data. The function control module 12 includes start function key 120 and select function key 122 at the surface of the control apparatus 1. When the start function key 120 is pressed, a start function signal is produced. When the select function key 122 is pressed, a select function signal is produced.

Referring to FIGS. 1 and 2, in this embodiment, the transmission module 18 can be coupled to the electrical apparatus 2 through a transmission line 19. The transmission line 19 has one end coupled to the transmission module 18, and the other end plugged into the electrical apparatus 2. Alternatively, the transmission module 18 may also be coupled to the electrical apparatus 2 wirelessly (for example, via Bluetooth).

In summary, the control apparatus with the balance feedback control of the present invention can achieve the following functions and results:

1. When the user conducts the control, the control of the objects on the display 3 is achieved in a balance feedback operating manner, thus greatly increasing the operation fidelity.
2. With the cooperation between the balance control module 14 and the dynamic adjustment unit 160, actions of balance that the user makes can be timely processed, thereby achieving a perfect operation result.
3. The control apparatus 1 of the present invention can provide the user with a variety of operation manners, which means the user needs not to buy other control apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control apparatus with a balance feedback function, the control apparatus is electrically coupled to an electrical apparatus, the control apparatus comprising:
   a direction control module having a plurality of direction keys configured to output a plurality of direction signals of different directions;
   an operation control module having a plurality of operation control keys configured to output a plurality of different operation control signals;
   a balance control module configured to detect a tilting angle between the control apparatus and a preset horizontal plane to generate a corresponding horizontal shift vector signal, or detect a vertical shift in a vertical direction of the control apparatus to generate a corresponding vertical vector signal;
   a processing module electrically coupled to each of the direction control module, the operation control module and the balance control module, the processing module receives the direction signal and produces a corresponding direction data according to the received direction signal, the processing module receives the operation control signal and produces a corresponding operation control data according to the received operation control signal, the processing module receives the horizontal shift vector signal and produces a corresponding horizontal vector data according to the received horizontal shift vector signal, the processing module receives the vertical vector signal and produces a corresponding vertical vector data according to the received vertical vector signal; and a transmission module electrically coupled to the processing module, the transmission module receives one of the direction data, the operation control data, the horizontal vector data and the vertical vector data produced by the processing module, the transmission is electrically coupled to the electrical apparatus for transmitting one of the direction data, the operation control data, the horizontal vector data and the vertical vector data.

2. The control apparatus with a balance feedback function in accordance with claim 1, wherein the processing module comprises a dynamic adjustment unit, and the dynamic adjustment unit generates the corresponding horizontal vector data or vertical vector data according to the one of the horizontal shift vector signal or vertical vector signal received by the processing module after the processing module receives a start signal for starting the dynamic adjustment unit.

3. The control apparatus with a balance feedback function in accordance with claim 2, wherein the start signal is transmitted from the electrical apparatus to the processing module through the transmission module.

4. The control apparatus with a balance feedback function in accordance with claim 1, wherein the direction control module at least comprises:

an up direction key configured to generate an up direction signal;

a down direction key configured to generate a down direction signal;

a left direction key configured to generate a left direction signal; and a right direction key configured to generate a right direction signal.

5. The control apparatus with a balance feedback function in accordance with claim 1, wherein the operation control module at least comprises:

a first operation control key configured to generate a first operation control signal;

a second operation control key configured to generate a second operation control signal;

a third operation control key configured to generate a third operation control signal; and a fourth operation control key configured to generate a fourth operation control signal.

6. The control apparatus with a balance feedback function in accordance with claim 1, further comprising a function control module, wherein the function control module is electrically coupled to the processing module and configured to output a plurality of different function signals, when one of the function signals is transmitted to the processing module, the processing module generates a corresponding function data.

7. The control apparatus with a balance feedback function in accordance with claim 6, wherein the function control module at least comprises:

a start function key configured to generate a start function signal; and a select function key configured to generate a select function signal.

8. The control apparatus with a balance feedback function in accordance with claim 7, further comprising a transmission line, wherein the transmission line has one end electrically coupled to the transmission module, and the other end coupled to the electrical apparatus.

9. The control apparatus with a balance feedback function in accordance with claim 7, wherein the control apparatus is a joystick.

10. The control apparatus with a balance feedback function in accordance with claim 7, wherein the control apparatus is a mouse.

* * * * *